United States Patent [19]

Dey

[11] 4,071,664

[45] Jan. 31, 1978

[54] ELECTROLYTE SALT ADDITIVE

[75] Inventor: Arabinda N. Dey, Needham, Mass.

[73] Assignee: P. R. Mallory & Co. Inc., Indianapolis, Ind.

[21] Appl. No.: 783,585

[22] Filed: Apr. 1, 1977

[51] Int. Cl.$^2$ ............................................. H01M 6/14
[52] U.S. Cl. .................................... 429/194; 429/199
[58] Field of Search .............................. 429/194–197, 429/199, 200

[56] References Cited

U.S. PATENT DOCUMENTS

| | | | |
|---|---|---|---|
| 4,012,564 | 3/1977 | Auborn | 429/194 |
| 4,020,240 | 4/1977 | Sihlalkjer | 429/196 X |

Primary Examiner—Charles F. LeFevour
Attorney, Agent, or Firm—Ronald S. Cornell; Israel Nissenbaum; Charles W. Hoffmann

[57] ABSTRACT

An electrochemical cell comprising an active metal anode and an electrolyte solvent/cathode depolarizer which reduces anode passivation during long time storage, even at elevated temperatures, by the inclusion of a minor proportion of an electrolyte salt additive having a clovoborate anion structure.

14 Claims, No Drawings

ELECTROLYTE SALT ADDITIVE

FIELD OF THE INVENTION

This invention pertains to electrolyte salt additives employed in non-aqueous electrochemical cells and more particularly to such cells utilizing a cathode system in which a fluid oxyhalide, a fluid non-metallic oxide, a fluid non-metallic halide, or a mixture thereof is both the electrolyte solvent and the primary active cathode substance.

BACKGROUND OF THE INVENTION

Electrochemical cells for use as power sources, particularly in conjunction with hearing aids and other medical related devices, are known which employ soluble or liquid cathodes as opposed to the more conventional solid cathode cells. In such soluble cathode cells the active cathode material is usually the electrolyte solvent or one of the co-solvents. During discharge, the solvent or co-solvents are electrochemically reduced on a current collector such as a screen having applied thereto a mixture of an inert and electrically conductive material such as carbon black, graphite, or other electrical conductor of high surface area, and, preferably, including absorbing and binding agents. The anode for these cells is preferably lithium metal, although other active metals above hydrogen in the activity scale or electromotive series including sodium, potassium, rubidium, calcium, magnesium, strontium, barium, cesium and aluminum may be used either singly or in combination.

Cathode cells based upon the utilization of lithium as the anode active metal and thionyl chloride ($SOCl_2$) as both electrolyte solvent and active cathode and lithium tetrachloroaluminate ($LiAlCl_4$) as the electrolyte salt have been prepared with roughly the dimension of conventional "D" and "C" size cells, using a convolutely wound structure. "C" cells were observed to realize about 156 watt-hours per pound, about 11.6 watt-hours per cubic inch and up to about 93 watts per pound at about 3 volts potential per cell for freshly prepared cells. These high potentials and capacities make this type of cell particularly useful in devices requiring infrequent replacement of cells such as in heart pacemaker devices. However, several problems exist with this cell which presently militate against its widespread practical use.

One deficiency of the cells described above, using only $LiAlCl_4$ as the electrolyte salt, is that filled or activated cells which have been stored, particularly at elevated temperatures for extended periods of time, will exhibit an undesirable initiation period or delay time when discharge is attempted. This initiation or delay time is due to passivation of the lithium anode, that is, formation of an electrically insulating film or layer over the lithium. In cells utilizing thionyl chloride this film is postulated to be lithium chloride (LiCl) and the severity of delay is dependent upon the conditions of storage. It has been observed, for example, that storage at about 72° C for about 4 days is sufficient to passivate the lithium anode to the extent that reverse polarization of the cell for several minutes may be necessary to sufficiently remove the insulating film or layer and reactivate the anode.

THE INVENTION

It is a feature of the present invention to provide an electrolyte salt additive for use in combination with conventional electrolytes. The additive is a compound which includes a cation of a metal and a clovoborate anion (for nomenclature, see R. Adams, Inorg. Chem. 2, 1087. (1963)). It has been found that a relatively small amount of the electrolyte salt additive, when used in electrochemical cells having an electrolyte salt such as $LiAlCl_4$, helps reduce passivation of the metal anode, and thus helps to reduce the voltage delay associated with start-up after storage at elevated temperatures. These and various other features of the invention as well as many specific advantages will be more fully apparent from a detailed consideration of the remainder of this disclosure.

DETAILED DESCRIPTION OF THE INVENTION

In copending application Ser. No. 610,518; filed Sept. 3, 1975 now U.S. Pat. No. 4,020,240 issued on Apr. 26, 1977 and assigned to the same assignee as the present application (the disclosure of which is incorporated herein by reference thereto) it is disclosed that an electrolyte salt containing a clovoborate anion and a metal cation can be used in place of the commonly used conventional electrolyte salt to eliminate the known voltage delay problem noted above. However, the aforementioned salts are difficult to obtain or synthesize and the cost of cells having such salts as the electrolyte is not presently commercially viable. It has now been discovered that such salts, when added in minor amounts to cells having a major portion of electrolyte salt which is one of the above noted conventional, commercially available salts such as $LiAlCl_4$, will reduce or even eliminate voltage delays associated with such cells.

The cation of the additive material of this invention is a metal selected from the group consisting of Li, Na, K, Rb, Cs, Mg, Ca, Sr, Ba and Al. This metal is usually, though not necessarily, the same as the metal of the anode of the electrical system in which the electrolyte is a component. Therefore, in high energy density cells currently available, the preferred metals are lithium (Li), sodium (Na), potassium (K), magnesium (Mg), calcium (Ca) and aluminum (Al). the clovoborate anion has the general formula $(B_m X_n)^{-k}$ where B is the element boron and m, n and k are integers and X can be selected from a wide range of elements and groups of elements which may also include organic groups alone or in combination. As examples of several clovoborate salts which are useful in electrochemical cells, X in the above formula is preferably a halogen (F, Cl, Br and I) but can also be H or OH, especially if in combination with a halogen or halogens. The halogenated form of the clovoborate anion appears to provide more advantageous results than the hydride form because, where X is hydrogen rather than halogen, the B—X bond appears less stable, but all nevertheless embody the concepts of the invention.

With the halogen and hydrogen forms of the clovoborate anion mentioned immediately above, the preferable forms would be those in which m and n of the above formula are integers selected from the group of 6–20 for m and 6–18 for n. Most preferably m and n are both 6, 9, 10, 11 or 12. Generally both m and n are the same, but in some cases they may differ. The integer k may range from 1-4 but preferably is 2. As a single embodiment a presently preferred composition is where X is chlorine and m and n are both 10. This compound is especially useful when used as an electrolyte salt additive in an electrochemical cell containing a metal anode such as lithium, an electrolyte salt such as $LiAlCl_4$ and an electrolyte solvent cathode depolarizer material such as thionyl chloride.

Use of the electrolyte salt additive embodying the concepts of the invention in an electrochemical cell having a lithium abode, a thionyl chloride electrolyte solvent/cathode depolarizer and a conventional electrolyte salt provides a cell capable of operating under heavy load conditions at low temperatures with minimal start-up delay even after extended periods of storage at elevated temperatures.

The electrolyte salt additive is used in accordance with this invention in an amount sufficient to alleviate any voltage delay which would occur if one or more conventional electrolyte salts is used alone. Preferably, the amount of additive salt used in the electrolyte solvent/cathode depolarizer ranges from a mole ratio of additive to conventional salt of about 0.01:1 to about 0.35:1 with a preferred ratio of 0.035:1 to 0.2:1.

In thionyl type cells with lithium anodes, specific presently preferred electrolyte salt additives known and characterized in the chemical literature include $Li_2B_{10}Cl_{10}$, $Li_2B_{10}Br_{10}$, $Li_2B_{12}Cl_{12}$, $Li_2B_{12}I_{12}$, $Li_2B_6Br_6$, and $Li_2B_{12}Br_8F_4$. Less preferred salts include $Li_2B_9Cl_8H$, $Li_2B_9Br_6H_3$, $Li_2B_{11}Br_9H_2$, $Li_2B_{12}H_8F_4$, $Li_2B_{12}H_7F_5$, $Li_2B_{12}H_6F_6$ and $Li_2B_{12}F_{11}OH$. $Li_2B_{10}Cl_{10}$ is the most preferred clovoborate salt additive in conjunction with $LiAlCl_4$ electrolyte salts. The electrolyte salt additives of the present invention are also useful in electrochemical cells utilizing a solvent selected from a fluid oxyhalide, or non-metallic oxide or non-metallic halide and mixtures thereof such as phosphorous oxychloride ($POCL_3$), selenium oxychloride ($SeOCl_2$), sulfur dioxide ($SO_2$), sulfur trioxide ($SO_3$), vanadium oxytrichloride ($VOCL_3$), chromyl chloride ($CrO_2Cl_2$), sulfuric oxychloride ($SO_2Cl_2$), nitryl chloride ($NO_2Cl$), nitrosyl chloride ($NOCl$), nitrogen dioxide ($NO_2$), sulfur monochloride ($S_2Cl_2$) and sulfur monobromide ($S_2Br_2$). Each of the above can be used together with thionyl chloride ($SOCl_2$) as electrolyte solvent/cathode depolarizer or separately. Cosolvents or solvents other than $SOCl_2$ may also be electrochemically reduced on the cathode, but this reduction will not occur at the same potential as that of $SOCl_2$. Cosolvents will thus alter the energy density of such cells, either lowering it or raising it depending upon the solvent or cosolvent chosen. However, cosolvents may be necessary or useful in improving high and low temperature characteristics of the cell or in modifying properties of the system.

Fluid oxyhalides such as phosphorous oxychloride ($POCl_3$), fluid non-metallic oxides or fluid non-metallic halides or mixtures thereof may entirely replace thionyl chloride, $SOCl_2$, for the purpose of the present invention even though the discharge voltage may be generally lower. All of the above electrolyte solvent/cathode depolarizer materials form passivating films on the anode making it subject to start up delays under varying storage conditions.

Examples of conventional electrolyte salts which are to be used in major proportion in the cells of this invention include the aforementioned lithium tetrachloroaluminate ($LiAlCl_4$), lithium tetrachloroborate ($LiBCl_4$) as well as other alkali metal tetrachloroaluminates, tetrachloroborates (which are not clovoborates), tetrabromoaluminates, tetrafluoroborates, hexafluorophosphates, hexafluoroarsenates, hexachloroantimonates, hexachlorotitanates, hexachlorostannates, tetrachlorogallates, tetrachloroindates, tetraphenylborates, tetraalkylborates (B $(C_nH_{2n+1})_4$— wherein $n$ is an integer from 1-5) benzene sulfonates, perchlorates and generally other alkali metal and alkaline earth metal halides with and without metal constituents in the anion. Examples of prior art electrolyte solvent/cathode depolarizer cells with other commonly used electrolyte salts are disclosed in U.S. Pat. No. 3,891,457 which disclosure is herein incorporated by reference thereto. Other electrolyte salts or solutes disclosed therein include Lewis acids such as aluminum trichloride ($AlCl_3$) and boron trichloride ($BCl_3$) and the like.

The following examples are illustrative of prior art electrolyte salt cells and attendant voltage delays, cells utilizing clovoborate compounds as the sole electrolyte salt, and cells utilizing prior art electrolyte salts with minor amounts of clovoborate electrolyte salt additives. In the examples, as throughout the specification and claims, all parts are parts by weight unless otherwise indicated. Any specific enumeration of detail in the examples is not to be interpreted as limiting the scope of the present case since these examples are being presented primarily for illustrative purposes.

EXAMPLE I (Prior Art Cells)

A plurality of D size cells (OD; 1.30 inches, L: 2.38 inches, Wall thickness 0.019 inch) having nickel cans are made by winding in alternate layers a 20 inch × 1.75 inch lithium anode and a carbon cathode with a glass filter paper separator therebetween into a cylindrical element. The lithium anodes comprise lithium metal on an expanded nickel current collector. The carbon cathodes are made from a 90:10 (wt) mixture of Shawinigan Black and Teflon pressed onto expanded nickel current collectors. The cells are filled with electrolyte after the insertion of an electrode element into each can. The electrolyte is 1 molar $LiAlCl_4$ in $SOCl_2$ without any additive of the present invention. The cells are stored at 72° C for 1,3 and 6 months and discharged at −30° C at currents of 1.0 and 3.0 amperes. All of the cells show substantial delays upon startup.

EXAMPLE II (Cells made in acordance with U.S. Pat. No. 4,020,240)

A plurality of cells are made in the same manner as the cells of Example I but using an electrolyte of 0.25 molar $Li_2B_{10}Cl_{10}$ in $SOCl_2$. The cells are stored for 1,3 and 6 months and discharged at −30° C at currents of 1.0 and 3.0 amperes. All of the cells show substantial improvement over the cells in Example I with little, if any, startup delay.

EXAMPLE III (Cells made in accordance with present invention)

A plurality of cells are made in the same manner as the cells of Example I but with the addition of $Li_2B_{10}Cl_{10}$ as an electrolyte additive. The $Li_2B_{10}Cl_{10}$ comprises 3% by weight of the total electrolyte salt and solvent mixture. The mole ratio of $Li_2B_{10}Cl_{10}$ to $LiAlCl_4$ is 0.1 to 1. The cells are stored at 72° C for 1, 3 and 6 months and are discharged at 1.0 and 3 amperes at −30° C and show substantial reduction of startup delay as compared to the cells of Example I and are relatively comparable to the cells of Example II.

It is understood that the above description and examples are merely set forth to illustrate the invention, that all art recognized equivalents of the materials may be utilized, and that such interchangeable utilization of equivalents is intended to be within the scope of this invention.

What is claimed is:

1. An electrochemical cell comprising an anode, a cathode depolarizer, a cathode collector, and an electrolyte comprising said depolarizer having dissolved therein a first electrolyte salt and a minor amount of a second salt having a metal cation and a clovoborate anion, said second salt being present in an amount sufficient to alleviate voltage delay.

2. The electrochemical cell of claim 1 wherein the amount of said second salt with respect to said first salt is within a mole ratio of from about 0.01:1 to about 0.35:1.

3. The electrochemical cell of claim 1 wherein said anode is comprised of a metal selected from the group consisting of Li, Na, K, Rb, Cs, Mg, Ca, Sr, Ba and Al or combinations thereof.

4. The electrochemical cell of claim 1, wherein said metal is Li.

5. The electrochemical cell of claim 1 wherein the cation of said second salt is selected from the group consisting of Li, Na, K, Rb, Cs, Mg, Ca, Sr, Ba, and Al and combinations thereof.

6. The electrochemical cell of claim 1 wherein the clovoborate anion has a formula $(B_m X_n)^{-k}$ wherein $m$, $n$ and $k$ are integers with $m$ ranging from 6-20, $n$ ranging from 6-18 and $k$ ranging from 1-4, B is boron, and X is selected from the group consisting of H, F, Cl, Br, I, OH and combinations thereof.

7. The electrochemical cell of claim 4 wherein said cathode depolarizer comprises a material selected from the group consisting of a fluid oxyhalide, a fluid non-metallic oxide, a fluid non-metallic halide, and mixtures thereof.

8. The electrochemical cell of claim 4 wherein said cathode depolarizer is $SOCl_2$.

9. The electrochemical cell of claim 4 wherein said first electrolyte salt is selected from the group consisting of lithium tetrachloroaluminate, tetrachloroborate, hexafluorophosphate, hexafluoroarsenate, hexachloroantimonate, hexachlorotitanate, hexachlorostannate, tetrachlorogallate, tetrachloroindate, tetraphenylborate, tetraalkylborate (LiB $(C_n H_{2n+1})_4$ wherein $n$ is an integer from 1-5), benzene sulfonate, halides, perchlorate; and aluminum trichloride and boron trichloride.

10. The electrochemical cell of claim 7, wherein said cathode depolarizer is selected from the group consisting of $SO_2$, $SO_3$, $VOCl_3$, $CrO_2Cl_2$, $SO_2Cl_2$, $NO_2Cl$, $NOCl$, $NO_2$, $SeOCl_2$, $POCl_3$, $SOCl_2$, $S_2Cl_2$, and $S_2Br_2$.

11. The electrochemical cell of claim 8 wherein said second salt is $Li_2B_{10}Cl_{10}$.

12. The electrochemical cell of claim 6 wherein X is halogen.

13. The electrochemical cell of claim 11 wherein said first electrolyte salt is lithium tetrachloroaluminate.

14. The electrochemical cell of claim 13 wherein said mole ratio is 0.1:1.

* * * * *